United States Patent Office 3,198,624
Patented Aug. 3, 1965

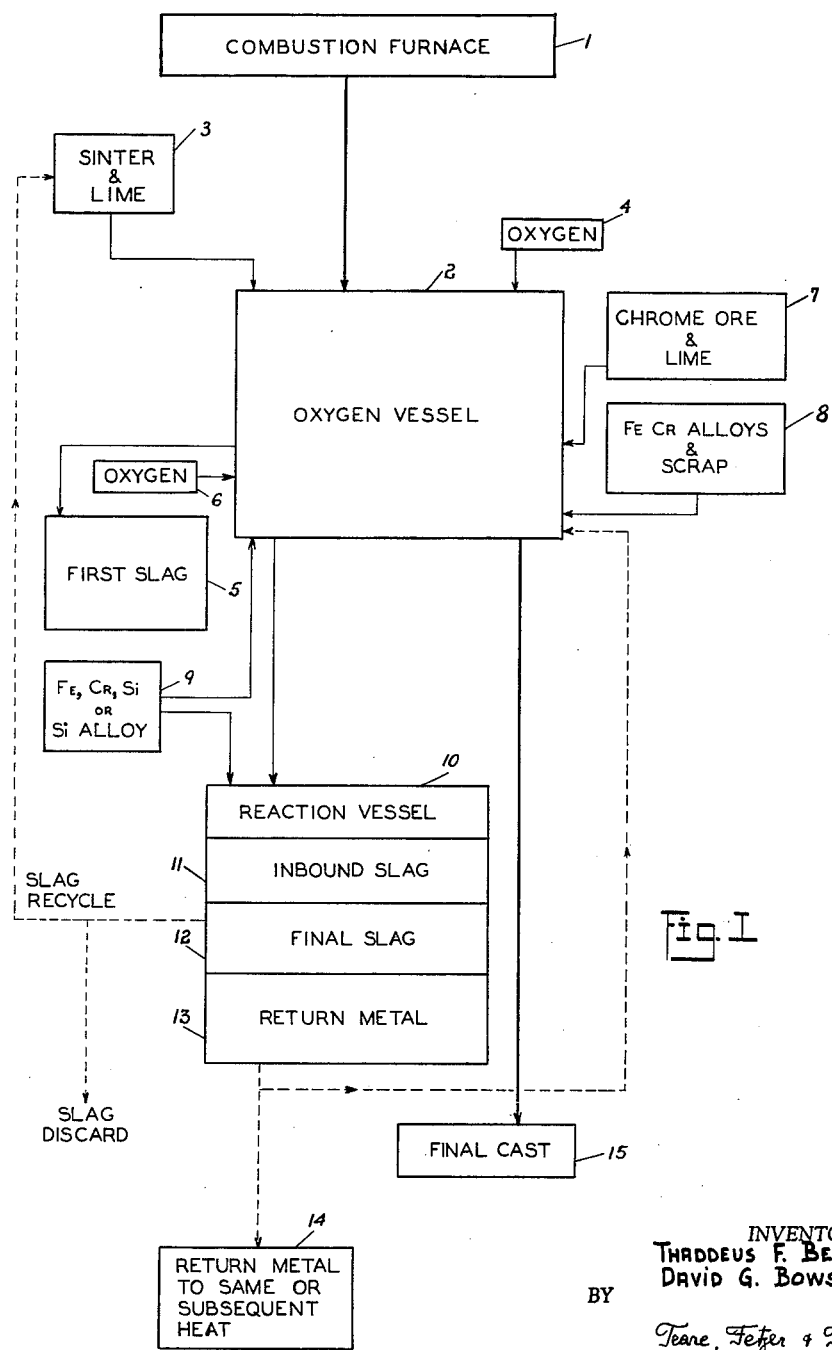

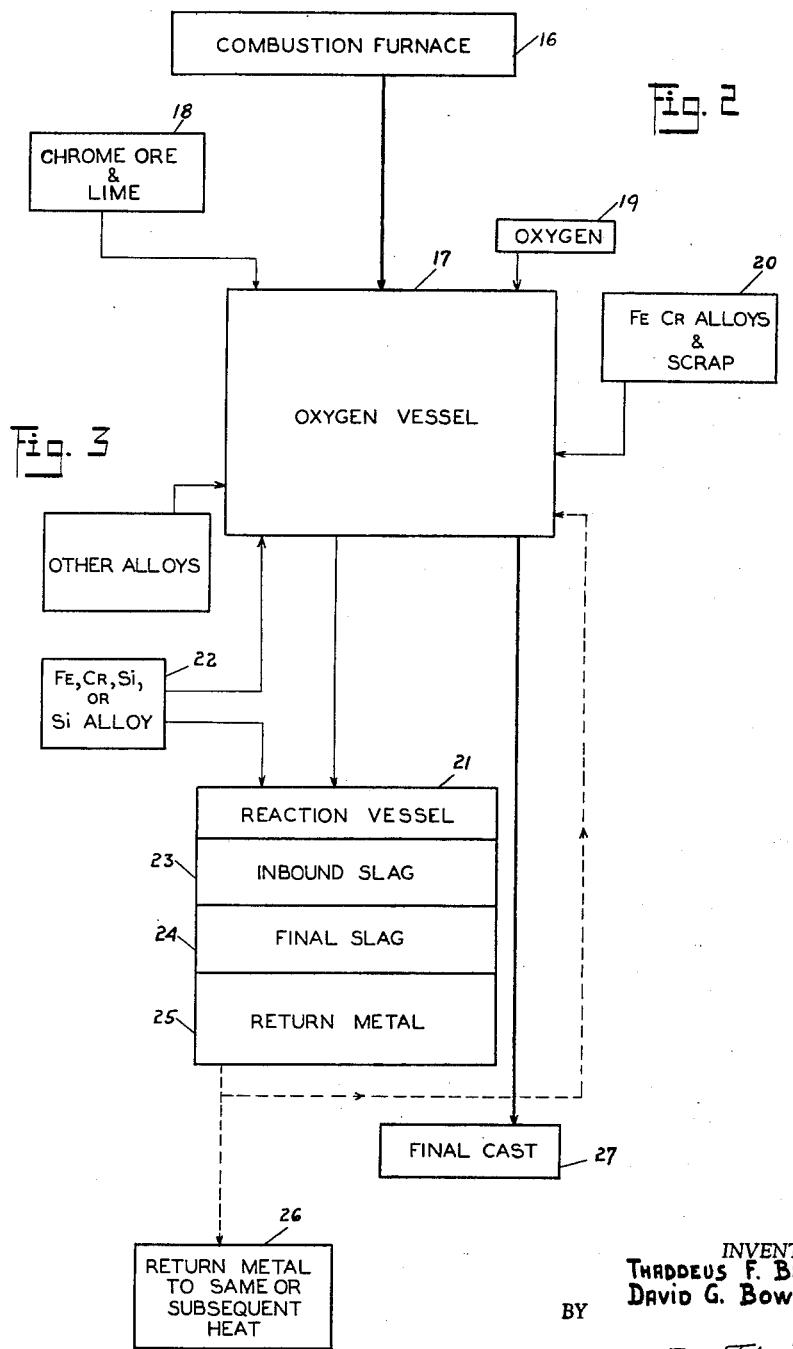

3,198,624
PROCESS FOR THE MANUFACTURE OF
STAINLESS STEEL
Thaddeus F. Bell, Cleveland Heights, and David G. Bowser, Brecksville, Ohio, assignors to Interlake Steel Corporation, a corporation of New York
Filed Aug. 24, 1961, Ser. No. 134,033
9 Claims. (Cl. 75—46)

This invention relates to a process for the producing of stainless steel.

Stainless steel is presently produced in the conventional electric arc furnace, which is ideally suited to remelt steel scrap. However, in the conventional process, the electric arc furnace is also used as (1) a metallurgical reduction vessel, and (2) an oxygen refining vessel. The electric arc furnace was not designed for such combination of uses, and as a matter of fact, possesses certain inherent inefficiencies when so used. For example, the prolonged procedure of melting scrap and ferrochrome in the initial charge, decarburizing with an oxygen blast, adding and remelting one or frequently two different slags, reducing the oxidized chromium and iron with silicon and finally finishing the heat with a final alloy, and/or scrap addition, creates severe erosion effects on the refractories comprising the hearth, walls, and roof of the furnace. The consequent replacement and repair of the refractories is expensive and results in costly delay. The erosion of the refractories tends to further produce non-metallic inclusions which are incompatible with the finished steel.

In conjunction with the electric arc melting of stainless steel, it has been recognized that oxygen may be injected into the furnace to lower the carbon content of the iron. However, the conventional method of oxygen lancing a stainless steel is based upon the use of opposing chemical and thermal requirements which results in an obvious compromise, e.g., the chromium-carbon temperature relationship that exists in this system is such that the minimum chromium oxidation is obtained when oxygen refining is performed after the steel bath has reached a very high temperature (3000° plus F.), however, due to the fact that oxygen reaction raises the temperature of the steel to the point where refractory attack becomes excessive, a compromise is made by starting the oxygen blow at a low temperature (some practices start the blow before the charge is completely molten) and by periodically cooling the bath with cold metal additions when the temperature climbs to undesirably high levels. This compromise results in the oxidation of a large quantity of the most expensive component, chromium, which forms a stiff, unworkable slag on the steel bath. The chromium oxide must be fluxed with lime to form a workable slag under the arc. The metallic oxides in the slag are then reduced with silicon such as ferrochrome silicon or other silicon bearing alloys in order to recover the elemental metals, such as chromium and nickel to the greatest extent possible. This reduction step being an exothermic reaction, tends to add additional temperature to the steel, and is most inefficient when carried out in large arc melting furnaces, due to the large surface area, stratification within the slag and the melt, and the difficulty in providing adequate agitation and mixing of the reaction substances.

In conventional electric arc melting practice, during the decarburization of the steel heat with oxygen, the nitrogen in the stainless steel heat is generally lower by several points, e.g., a melt assaying .03 to .04% nitrogen will be lowered to .02 to .03% nitrogen, and a melt of .05 to .08% nitrogen will be lowered to .04 to .05% nitrogen. However, in forming the reduction slag, reducing the oxidized metal values, and finishing the heat, the nitrogen level will rise again to higher values. This has been attributed to the formation of nascent nitrogen in the electric arc furnace and prolonged exposure to the nitrogen in the furnace atmosphere. In many grades of stainless steel, high nitrogen content is harmful to the finished product.

The conventional electric arc melting process for producing stainless steel is based upon the remelting of scrap; either scrap generated within the plant, or scrap purchased from dealers. It usually consists of a blend of stainless steel scrap and low alloy scrap depending upon the availability and price as well as quality. This practice requires considerable electrical energy and tends to build up the concentration of harmful trace elements, such as (lead, zinc, copper, etc.) in the product.

It is a primary object of the present invention to produce a stainless steel that is not dependent for its production upon the electric arc melting process.

It is a further object of the present invention to produce a stainless steel of improved quality and at a lower cost than has heretofore been known or produced by the electric arc process.

It is an additional object of the present invention to produce a stainless steel, wherein conventional facilities other than those utilized in the electric arc melting process may be utilized.

It is another object of the present invention to devise a process for making stainless steel utilizing molten metal poured directly from the blast furnace or other type of combustion furnace.

It is still another object of the present invention to devise a new and novel process for producing type 430 stainless steels as well as other types of stainless steel, and heat resistant steels containing more chromium than is normally present in standard carbon steel.

Other objects and advantages of this invention will become apparent to those skilled in the art from the description which follows:

In usual steel making operations, chromium is prone to oxidize during the reduction of the carbon in the melt. This has been particularly notable in making stainless steel in conventional electric arc furnaces where the chromium will oxidize under the temperatures present during the blowing operation for reducing carbon. We have found that if the temperature of the melt can be raised during the oxygen blowing operation sufficient to reduce the carbon and if large amounts of chromium bearing ingredients are introduced into the melt after the temperature has reached approximately 3100° F. the chromium is not lost, as would be the case if the chromium is present while the temperature is being brought up to 3100° F. during the reduction of the carbon. Accordingly, in one form of our process for making stainless steel a molten iron which is substantially free of chromium may be poured directly from a blast furnace or other combustion type of furnace including a cupola, into an oxygen refining vessel where it is subjected to heat sufficient to raise the temperature which is favorable to decarburization. After the temperature has reached about 3100° F. then chromium bearing ingredients are added to the melt in amounts sufficient to prevent chilling thereof. The melt is then subjected to a second oxidation or oxygen blow within the oxygen refining vessel until the carbon and silicon reach a predetermined low level. In the event that the slag at the end of the second oxidation is rich in chromium then such element may be recovered, if desired, in a reaction vessel into which the slag is poured. In the reaction vessel ferrochromium silicon or silicon alloys are added to the slag as a result of which metal, rich in chromium, is recovered and may be utilized, if desired, subsequently in the oxygen refining vessel for controlling the content of the chromium in the stainless steel produced therein.

As an alternative, chromium in the chrome rich slag may be recovered in the oxygen refining vessel by introducing ferrochromium silicon or silicon alloys directly into the oxygen vessel, whereby the reaction would take place at the end of the oxygen blow.

A modification of our invention embodies the taking of chromium bearing iron in molten form and refining it in an oxygen refining vessel. In such case sufficient silicon is utilized to restrict the oxidation of chromium in the refining vessel until the temperature reaches about 3100° F. or above, at which temperature the chromium will alloy readily with the iron to produce the stainless steel.

In one form of our invention the chromium bearing iron is produced in the blast furnace and is poured directly into the refining vessel. Chromium bearing iron may be made in the blast furnace by utilizing chrome bearing ore with the iron ores as part of the normal operation of the furnace. In another form of the invention the chrome bearing material is interspersed with the coke used in the blast furnace burden. In this latter form, the chrome bearing materials are carried down the shaft of the furnace with the coke to the tuyere zone, where they are rapidly heated to reduction temperature and readily alloy with the iron in the furnace hearth.

Where chromium bearing iron is utilized, the molten iron is subjected within the oxygen refining vessel to oxygen sufficient to raise the temperature of the melt to a point which is favorable to decarburization and low chromium oxidation. Where the chromium content in the molten chromium bearing iron is insufficient to produce the desired analysis of the stainless steel, chromium bearing alloys, ore, or scrap may be added to the charge within the oxygen refining vessel, as in the case where non-chromium bearing iron is utilized. The slag, containing oxidized chromium from the oxygen vessel, if desired, may be poured into a separate reaction vessel and reduced in order that the chromium metal contained within the slag may be returned to the oxygen refining vessel, for further utilization and control of the content of chromium in the stainless steel produced.

Our invention embodies a method of making chromium bearing coke for use in a blast furnace as stated aforesaid. Such process may be carried out by crushing coal to a desired degree of fineness and intermixing chrome bearing ore in the crushed coal. The mixture is then treated in a coke oven during which operation the ore will be interspersed within the coke and mechanically held therein.

The invention has generally been described. Further preferred embodiments of the invention will be referred to in detail, by reference to the accompanying drawings, in which:

FIG. 1 is a flow sheet, showing one embodiment of the present invention, utilizing molten iron that is poured directly into an oxygen refining vessel.

FIG. 2 shows a similar flow sheet, showing a further embodiment of the present invention wherein a molten chromium bearing iron is poured directly into an oxygen refining vessel.

FIG. 3 shows another embodiment of the present invention wherein other alloys such as nickel, manganese, titanium, columbium, and so forth may be added to the oxygen refining vessel as desired.

Though we will proceed to illustrate our process as being used in making type 430 stainless, it is to be noted that other types of heat resistant iron and steels may be produced by our process. With reference to the flow sheet of FIG. 1, iron in the molten state, substantially free of chromium, at between 2400 and 2900° F. together with sinter and lime, are poured directly into an oxygen refining vessel from a blast furnace or other type of combusion furnace. The oxygen vessel is preferably rotatable so as to facilitate the necessary heat transmission to the melt and to protect the lining within the vessel from overheating. The melt is then subjected to an oxygen stream wherein the silicon, phosphorous and carbon content of the melt are oxidized and drawn off as gaseous products, or as an initial or preslag, upon reaction with the oxygen. At a temperature of about 3100° F. or above, which results in a substantial lowering of the affinity of chromium for oxygen, chromite (chrome ore) and lime are charged into the refining vessel and will, upon resumption of the oxygen blow form a slag rich in $Cr_2O_3$. The melt is maintained at a favorable temperature between 2800 and 3400° F. and ferrochromium alloys, and/or steel scrap are charged into the refining vessel in sufficient quantities to raise the chromium content in the steel to between 14 and 18%.

Again with reference to FIG. 1, although this reaction may be carried out in the oxygen vessel, as an alternative, it may be desirable to pour the slag rich in $Cr_2O_3$ into a portable reaction vessel or ladle designed for this purpose, and thus add ferrochrome, silicon, or silicon alloys during such pour. The high chromium alloy so produced and termed "return metal" may then be recirculated to the steel remaining in the oxygen refining vessel to bring the stainless steel to a desired analysis, or it may be cast directly into an ingot and utilized in a subsequent heat. When recovering the chromium content within the reaction vessel, a final basic slag is produced, which may be returned to the oxygen vessel for further processing. In such cases, this final slag will lessen the amount of sinter and lime needed at the beginning of the reaction when the oxygen refining vessel is in continuous operation.

In a modified form of our invention as indicated in FIG. 2, chromium bearing iron may be utilized in place of the substantially chromium free iron normally obtained in a blast furnace. Such chromium bearing iron may be produced in the blast furnace by the introduction of chromium bearing ores with the iron ores in the normal operation of the furnace. A modified form of our invention includes the preparation of chromium bearing coke instead of utilizing chrome bearing ores intermixed with the iron ores. In either case silicon is present in sufficient amount to restrict chromium losses in the oxygen refining vessel while the temperature is being raised therein to the point where the chromium will alloy with the iron in the formation of stainless steel. Such temperature is about 3100° F. or higher.

The introduction of silicon into the chromium bearing iron produces an exothermic reaction during the oxygen blow which reverses the affinities of carbon and chromium for oxygen, whereby the silicon and carbon will be burned in the oxygen refining vessel before the chromium is lost by oxidation. The exothermic reaction produced by the oxidation of the silicon quickly raises the temperature of the chrome bearing iron to 3100° F. or above, at which temperature, the loss of chromium, due to the oxygen blow is greatly reduced. In such cases up to about 5% silicon is satisfactory to prevent oxidation of the chromium until this desired degree in temperature is reached. The carbon present in the chromium bearing iron simultaneously burns with the silicon in the oxygen refining vessel until the carbon and silicon reach a desirable low level. In this form of producing stainless steel, we prefer to utilize the chromium bearing iron at a composition close to the eutectic in the iron, chromium, carbon, silicon system, and carrying about 5 to 25% chromium and about .50 to 5.00% silicon. Lime and chromite (chrome ore) are added to the oxygen refining vessel instead of sinter and lime when chromium bearing iron is used, with the result that the vessel is operated until the carbon reaches the optimum low degree. When the chromium content of the chrome bearing iron is not at an initially high level (e.g. 8 to 15%) then it is desirable to raise the chromium content in the stainless steel by the addition of ferrochromium alloys and steel scrap sufficient in amount to produce the required chromium content. As in the prior example, utilizing a non-chromium bearing iron, the chromium content of the chromium rich basic slag resulting from the oxidation within the oxygen refining vessel may be recovered in the oxygen refining vessel, or in a reaction vessel by the addition of reducing agents, such as ferrochrome, silicon or other ferro alloys. In the latter case the high chromium alloy so produced may then be returned to the oxygen defining vessel in amounts sufficient to bring the stainless steel to a desired analysis.

Our invention contemplates the making of chromium bearing iron from a chromium bearing coke. This is accomplished by introducing chromite ore into a blast furnace or other type of combustion type furnace by first mixing the chromite ore into the coal that is charged into the coke oven. More specifically, a raw or lump coal may be crushed to a fineness sufficient to pass 80% by weight through ⅛ inch mesh openings, and chromite ore of about 35 mesh size is mixed with the crushed coal. The chromite ore and coal mixture is then placed in an ordinary coke oven and is subjected to a heat of about 2400° F. to transform the coal into coke. The chrome ore particles, upon being mixed with the coal in this way, will be thoroughly dispersed throughout the structure of the coke. In such cases the chromium bearing material will comprise about 20% by weight of the mixture based on a chromite ore containing about 50% by weight of $Cr_2O_3$. Upon removal of the chromium bearing coke from the coke oven and when introduced into a blast furnace, the chromite ore particles travel to the tuyere zone of the furnace where they are rapidly heated to reduction temperature and readily alloy with the iron when descending to the furnace hearth.

Our use of the coke in this way will permit normal burdening of the blast furnace or other type of combustion furnaces, for the chromium ore does not become active until the coke is consumed in the lower portion of the furnace. For example, at the high temperature of the tuyere zone, both FeO and the $Cr_2O_3$ comprising the chromium ore are reduced to metallic chromium and iron. Since these elements are intimately locked in the mineral crystal, the immediate formation of an alloy of iron and chromium results. The particles of ferrochromium, so produced, are dissolved in the molten iron while descending to the hearth of the furnace. The chromium ore being a high refractory material is not released into the melt until the carbon component of the coke is consumed, therefore the chromium in the coke cannot enter the reaction taking place within the furnace stack above the hearth. It is for this reason, that the particles of chromium are released low in the furnace, and, being soluble in molten iron, are immediately dissolved by the iron in the hearth. By thus producing iron with a 5 to 25% chromium content, the metal in the hearth is in the eutectic zone of the iron, chromium, carbon, silicon system and the historical difficulties of producing ferrochromium in the blast furnace or other type of combustion furnace are obviated.

As a further embodiment, either in the case wherein a chromium bearing iron is utilized, or in the case utilizing a non-chromium bearing iron, alloying elements such as nickel, manganese, and other low carbon metals may be added to the heat during the final stages of the oxidation to control the content of the stainless steel. Such alloy additions are shown at FIG. 3.

More specifically, and with reference to FIG. 1, a blast furnace or other type of combustion furnace is illustrated at 1, wherein 2240 pounds of iron containing .75% silicon and 4.20% carbon are tapped from the furnace at about 2700° F., into a rotatable oxygen refining vessel shown by the rectangle at 2. In normal practice the upper and lower limits of the preferred range for the silicon and carbon content within the furnace at the desired tapping temperature will be as follows:

0.50 to 5.00% Si
4.50 to 3.00% C
Balance iron
2400 to 2900° F.

If the iron from the furnace is substantially free of phosphorous then a preslag (slag withdrawal) operation is unnecessary. However, if the phosphorous is present in objectionable amounts then such a preslag operation is desirable to remove the phosphorous. In normal procedure 2.2% of sinter or iron ore and 2.5% of lime, based on the weight of the iron in the charge indicated at 3, are introduced into the oxygen refining vessel. The lime utilized in the process is a commercial burnt lime, which assays about 95% CaO with about 5% impurity, such as silica and alumina. Oxygen indicated by the rectangle at 4 is then introduced into the refining vessel until a first or preslag, where objectionable amounts of phosphorous are present, is formed at 5 which results in a typical composition as follows:

44.3% CaO
34.1% $SiO_2$
3.0% FeO

The balance to constitute 100% would comprise MgO, alumina, $Al_2O_3$, phosphorous, $P_2O_5$ and manganese oxide.

Where a preslag operation is indicated due to a phosphorous content as aforesaid, it is desirable to pour the slag when the phosphorous is at a predetermined low point, which will occur when the carbon is at approximately .20 to .70%. After the preslag is decanted from the refining vessel and while the latter is rotating, a second decarburization with oxygen or blow starts, as indicated by the rectangle at 6. At the commencement or during the second blow about 4.3% of chromium ore and 6.17% of lime, based on the weight of the iron in the charge, are introduced into the oxygen refining vessel as shown by the rectangle at 7. During the second blow, ferrochromium alloys and/or steel scrap, consistent with maintaining a desirable high temperature in the melt, e.g. 3100° F. or above, are then added to the oxygen refining vessel as shown by the rectangle at 8. Before the end of the second blow, the composition of steel alloy will assay approximately as follows:

14.92% Cr
0.06% C
0.00% Si
Balance iron

The optimum temperature of the melt during the second blow would be about 320° F. or higher.

The chromium content of the chromium rich basic slag, which assays at about 15% $Cr_2O_3$, 47% CaO, and 25% $SiO_2$, with the balance being FeO, $Al_2O_3$ and MgO, is then recovered by reacting with silicon in the form of ferrochromium silicon or silicon alloy as shown by the rectangle at 9. As noted from the flow sheet, this reaction may be carried out in the oxygen vessel, or it may be desirable in some cases to pour the slag from the oxygen vessel into a portable reaction vessel or ladle, as indicated by the rectangle at 10. In the latter case the ferrochromium silicon or silicon alloy is preferably added to the molten stream in the pour from the oxygen vessel to the reaction vessel, thus assuring a proper mixing of the additives within the slag. The initial or inbound slag first formed within the reaction vessel as shown by the rectangle at 11 may vary in composition as follows:

2 to 30% $Cr_2O_3$
40 to 55% CaO
20 to 40% $SiO_2$

Ferrochromium silicon or silicon alloys are then added to the reaction vessel as reduction agents. The mixing of the ferrochromium silicon or silicon alloys within the reaction vessel through chemical reaction, reduces the $Cr_2O_3$ to about .7%, with the CaO about 51.08% with the balance being about 38.11% $SiO_2$ and the remainder being FeO, $Al_2O_3$ and MgO. This produces a final slag as shown by rectangle at 12. The final slag may then be recirculated back to the oxygen refining vessel 2, as shown by the dotted line wherein the sinter and lime shown at 3 of the flow sheet may be eliminated from the charge when the oxygen refining vessel is in continuous operation. The composition of the metallic chromium after the slag formation within the reaction vessel would assay at about 60.4% Cr, 18.2% Si, .03% C with the balance being iron as indicated by the rectangle at 13, and termed "return metal." The upper and lower limits in the preferred range of the metallic chromium produced within the reaction vessel would be as follows:

50 to 80% Cr
20% Si Max.
0.20% C Max.
Balance iron

While the chromium is being produced in the reaction vessel, the metal remaining in the oxygen vessel is being analyzed. If such metal requires more chromium, then the chromium in the reaction vessel is returned to the oxygen vessel in the amount desired or required to bring the chromium content up to the desired level. If the return metal from the reaction vessel is not immediately desired, or required, then it is cast and used in a subsequent heat as shown by the rectangle at 14.

During the second blow, the amount of alloy or scrap added and the time at which they are added will vary. This depends on the extent to which the reaction is taking place within the oxygen vessel. The key to the operation is the high temperature at which the vessel is operated, but in practice, observation of the volume and color of the flame emitted by the vessel determines the time and the amount of ferrochrome alloy or scrap to be added to the vessel. For example, the rate at which the alloys or scrap is fed is critical. It is controlled by observation and maintenance of the carbon flame at the desired volume and for a specified time. In practice, the alloys or scrap are not added until the flame for the second blow is pretty well established. The material is added as soon as the flame is well established. The amounts are graduated either faster or slower as required to maintain the established flame, and the desired high temperature of the melt. The total amount of alloy or scrap introduced is precalculated in accordance with the percentage desired in the final cast. When the carbon flame dies down, then the carbon is about as low in percentage as can be obtained. During the oxygen blow, one has the choice of using high carbon alloys or low carbon alloys. It is preferable, however, to use the high carbon alloys during the blow and the low carbon alloys at the end of the blow.

Toward the completion of the second oxygen blow, if more chromium is required, then the return metal from the reaction vessel or additional low carbon ferrochromium may be introduced into the oxygen vessel. This may be done simply by a mixing operation resulting from rotation of the oxygen vessel. At the completion of such mixture, the metal is poured from the oxygen vessel into a ladle and when it is at the proper temperature it is cast as shown by the rectangle at 15.

The final casting may weight about 2975 pounds and will have a composition of about 16.17% Cr, 0.056% C, 0.013% P, 0.013% S, 0.002% $N_2$, with the balance being chiefly iron. The preferred upper and lower limits of the chromium and the maximum limits of other ingredients comprising the final casting will assay as follows:

14 to 18% Cr
0.12% C Max.
1% Si Max.
1% Mn Max.
0.040% P Max.
0.030% S Max.
Balance iron In the other form of the above described process, and with reference to FIG. 2, a blast furnace or other type of combustion furnace is shown by the rectangle at 16, wherein 2240 pounds of chromium bearing iron produced from the chromium bearing coke and containing silicon in an amount sufficient to prevent oxidation of the chromium, are poured directly into an oxygen refining vessel at about 2800° F., as shown by the rectangle at 17. The upper and lower limits, and the corresponding temperature range of the chromium bearing iron that is introduced into the oxygen vessel will be as follows:

5 to 25% Cr
0.50% to 5.00% Si
3.00 to 5.00% C
Balance iron
2400 to 2900° F.

When the heat, rapidly raised by the exothermic reaction produced by oxidation of the silicon in the melt raises the temperature to 3200° F. or above, to reduce oxidation of the chromium, the oxygen refining vessel is charged with about 8.7% chormium ore and about 12.7% of lime based on the weight of the iron in the charge as shown by the rectangle at 18. The melt is then subjected to a further decarburization with oxygen as shown by the rectangle at 19. The reaction is maintained until the carbon burns to an optimum low degree. For example, the composition within the oxygen vessel would be as follows:

12.93% Cr
0.00% Si
0.06% C
Balance iron

When the chromium content of the chromium bearing iron is not at an initially high level (e.g. 8 to 15%), about 0.54% ferrochrome alloys, which may comprise approximately 65.0% Cr, 0.50% Si and 0.05% C along with about 42.4% of scrap which may comprise approximately 16.25% Cr and 0.056% C, based on the weight of the iron in the charge are then added to the melt at a temperature between 2800 and 3400° F. and producing a composition as follows:

13.23% Cr
0.06% C
0.00% Si
Balance iron

When the flame within the oxygen vessel commences to die down, it is known that the carbon is present in its lowest percentage, at which time the oxygen blow is stopped and the melt ready for casting as shown at 27.

Again as an alternative, the slag may be poured into the reaction vessel 21 wherein the process would correspond to that as described with respect to only where non-chromium bearing iron is used as a charge and as shown at 20–26 of the flow sheet. In such case, the "return metal" from the oxygen vessel, which comprises approximately 67.9% Cr, 8.6% Si and 0.03% C, is returned to the oxygen vessel, if necessary, to raise the chromium to a desired level. In such case the stainless steel in the final casting would have a composition apparently of about 16.25% Cr, .056% C, .480% Si, .013% P, 0.13% S, .002% $N_2$ and balance iron. The preferred upper and lower limits of the chromium and maximum limits of other ingredients in the final casting will assay at about:

14–18% Cr
0.12% C Max.
1% Si Max.
1% Mn Max.
.040% P Max.
.030% S Max.

The process designated by the rectangle of FIG. 3 indicates that any desirable alloys may be used or introduced into the oxygen refining vessel after the oxygen blow has been completed. As noted, these alloy additions may be made when using iron alone as a charge, or when using a chromium bearing iron as a charge. Such ingredients are low carbon metals. These, of course, operate to chill the bath but at such time the temperature is already too high for casting. The items designated other alloys, can be either the elements or alloys of the elements, such as for example, ferro nickel, or nickel, manganese metal, or ferro manganese, titanium metal, or ferro titanium. In some cases, when necessary, columbium may be added as a ferro columbium.

In cases where low carbon alloys are added to the oxygen vessel, the ferrochromium alloys and steel scrap additions may be varied between 2.4% and 33.5% to produce a final stainless steel composition as follows:

18.25% Cr
9.10% Ni
0.056% C
0.50% Si
0.013% P
0.013% S
0.002% $N_2$
Balance iron From the foregoing description of the method for preparing stainless steel, it is apparent that its application results in many important advantages.

Due to the high heat generated within the oxygen vessel during the blow, molten charges of iron may be tapped directly from a blast furnace or other type combustion furnace, thus conserving energy otherwise required to melt a solid charge.

As a further advantage, the consumption of refractory materials is reduced by carrying out the process in facilities designed especially for such purposes.

As a still further advantage, high chromium recoveries are possible during the oxygen refining due to the removal of the temperature limits compromise that exists with respect to conventional processes.

Another advantage of the instant process lies in reducing the amount of silicon required to recover the chromium that is oxidized by the oxygen refining reaction, thus saving costs.

As an additional advantage, there is a complete elimination of a generation of nitrogen in the reaction vessel due to the absence of an electric arc and in particular the instant process results in an expulsion of atmospheric nitrogen by the generation of other gases.

In essence, the invention ultimately divorces the manufacture of stainless steel from its long dependence upon the electric arc furnace, and upon the steel scrap market with related variations in availability, price and quality, thus resulting in a stainless steel that contains lower levels of harmful trace elements than has heretofore been possible with existing processes.

As many possible embodiments may be made of our invention, and as many changes may be made in the illustrative embodiments hereinbefore set forth, it will be undertsood that all matter described herein or shown in the accompanying drawings is to be interpreted as illustrative and not by way of limitation.

We claim:

1. The process of making stainless steel, comprising preparing molten chromium bearing iron having approximately 5% to 25% chromium and approximately 3% to 5% carbon from a chromium bearing coke with about 20% by weight of chromium bearing material based on a chromite ore containing about 50% of $Cr_2O_3$, and in a combustion type furnace, providing the molten iron with approximately 0.5% to 5% silicon to maintain the temperature sufficiently high and at least at 3100° F. to restrict oxidation of the chromium before oxidation of the carbon, introducing the molten iron into an open refining vessel, maintaining said temperature, and subjecting the molten iron to a stream of oxygen sufficient to produce stainless steel having approximately 12% to 18% chromium and up to 0.12% carbon therein.

2. The process of claim 1, comprising introducing additional chromium bearing ingredients into the open refining vessel in sufficient amounts to produce stainless steel having said amount of chromium therein.

3. The process of claim 2, comprising continuing to subject the molten metal to a stream of oxygen sufficient to reduce the carbon content to its lowest level.

4. A process for making chromium bearing iron in a combustion type furnace where iron ore is reduced and melted by the heat of combustion, comprising introducing iron ore and a flux into the furnace, introducing metallurgical coke having a sufficient quantity of chromium held in its structure to produce chromium bearing iron wherein the chromium is present within the range of 5 to 25%.

5. The process of claim 4, in which the chromium bearing iron contains between 3 and 5% carbon.

6. A process for making chromium bearing coke comprising crushing coal until it is sufficient to pass about 80% thereof by weight through a screen having mesh openings of ⅛ of an inch, mixing the crushed coal with about 20% by weight of chromium bearing material based on a chromite ore containing about 50% of $Cr_2O_3$, with a fineness sufficient to pass through about a 35 mesh screen and heating the mixture to a temperature of about 2400° F. and maintaining the heat until the coal is transformed into coke and the chromium bearing material is interspersed within the coke.

7. A process for making stainless steel comprising introducing molten chromium bearing iron having between approximately 5% to 25% chromium therein and between approximately 0.5% to 5.00% silicon, and between approximately 3% to 5% carbon therein, into an open refining vessel, subjecting the molten metal to a stream of oxygen to raise the temperature of the molten metal to substantially 3100° F. by burning of the silicon and carbon, introducing between approximately 4.3% to 8.7% chromium ore, and between approximately 6.17% to 12.7% lime, based on the weight of the molten iron in the refining vessel after the temperature has reached about 3100° F., and continuing the application of oxygen sufficient to maintain the temperature at least as high as said 3100° F. to restrict the oxidation of the chromium and to produce a stainless steel having between 12% to 18% chromium and up to 0.12% carbon therein.

8. A process of making stainles steel, comprising preparing molten chromium bearing iron having approximately 5% to 25% chromium and approximately 3% to 5% carbon therein from a chromium bearing coke in a combustion type furnace, providing the molten iron with approximately 0.5% to 5% of silicon to maintain the temperature sufficiently high and at least 3100° F. to restrict oxidation of the chromium before oxidation of the carbon and subjecting the molten iron to a stream of oxygen to produce a stainless steel having approximately 12% to 18% chromium and up to 0.12% carbon therein, the chromium bearing coke having sufficient amounts of chromium held mechanically in its structure to produce stainless steel having said amount of chromium therein.

9. A process for making stainless steel comprising, preparing molten chromium bearing iron containing substantially 5% to 25% chromium in a combustion-type furnace, providing silicon to the melt to restrict oxidation of the chromium, subjecting the melt to a stream of oxygen to cause raising of the temperature of the molten iron to approximately 3100° F., introducing chromium bearing ingredients into the melt while maintaining the temperature thereof at least at said 3100° F. and continuing to subject the melt to a stream of oxygen to reduce the carbon content and to produce a stainless steel having between approximately 12% to 18% chromium.

References Cited by the Examiner

UNITED STATES PATENTS

| | | | |
|---|---|---|---|
| 1,444,062 | 2/23 | Carney | 75—60 X |
| 1,793,153 | 2/31 | Becket | 266—34 |
| 1,893,109 | 1/33 | Simpson | 75—130.5 |
| 2,515,631 | 7/50 | Chiswik | 266—34 |
| 3,003,865 | 10/61 | Bridges | 75—60 |

FOREIGN PATENTS

| | | |
|---|---|---|
| 3,314 | 1876 | Great Britain. |
| 186,982 | 10/22 | Great Britain. |
| 197,733 | 5/23 | Great Britain. |
| 198,633 | 6/23 | Great Britain. |

DAVID L. RECK, *Primary Examiner.*

MARCUS U. LYONS, *Examiner.*